United States Patent
Bowers et al.

(10) Patent No.: US 10,042,083 B2
(45) Date of Patent: Aug. 7, 2018

(54) SYSTEMS AND METHODS FOR MICROWAVE SENSING OF OBJECT PROPERTIES

(71) Applicant: Elwha LLC, Bellevue, WA (US)

(72) Inventors: Jeffrey A. Bowers, Bellevue, WA (US); Tom Driscoll, San Diego, CA (US); Roderick A. Hyde, Redmond, WA (US); Jordin T. Kare, Seattle, WA (US); David R. Smith, Durham, NC (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 768 days.

(21) Appl. No.: 14/333,340

(22) Filed: Jul. 16, 2014

(65) Prior Publication Data

US 2016/0018264 A1    Jan. 21, 2016

(51) Int. Cl.
    *G01K 11/06*      (2006.01)
    *G01V 8/00*      (2006.01)
    *G01K 11/00*      (2006.01)
    *G01J 5/00*      (2006.01)

(52) U.S. Cl.
    CPC ............ *G01V 8/005* (2013.01); *G01K 11/006* (2013.01); *G01J 2005/0081* (2013.01)

(58) Field of Classification Search
CPC combination set(s) only.
See application file for complete search history.

(56) References Cited

U.S. PATENT DOCUMENTS

| | | | |
|---|---|---|---|
| 4,798,209 A | 1/1989 | Klingenbeck et al. | |
| 4,965,451 A | 10/1990 | Solter | |
| 5,417,494 A | 5/1995 | Kempa et al. | |
| 5,961,871 A * | 10/1999 | Bible ................ | H05B 6/686 |
| | | | 219/709 |
| 6,343,534 B1 | 2/2002 | Khanna et al. | |
| 6,791,487 B1 | 9/2004 | Singh et al. | |
| 7,044,634 B2 | 5/2006 | Sandvoss | |
| 7,795,583 B1 | 9/2010 | Hubbard et al. | |

(Continued)

OTHER PUBLICATIONS

Chan et al. "A single-pixel terahertz imaging system based on compressed sensing", Applied Physics Letters, 93, 121105, 2008.*

(Continued)

*Primary Examiner* — Lisa Caputo
*Assistant Examiner* — Nasir U Ahmed
(74) *Attorney, Agent, or Firm* — Foley & Lardner LLP (57) ABSTRACT

A thermal sensing device can include an electromagnetic radiation source configured to generate electromagnetic radiation, a first antenna configured to direct electromagnetic radiation generated by the radiation source toward a target, and a second antenna configured to receive microwave radiation emitted from an internal portion of the target. The thermal sensing device can also include a microwave sensor coupled to the second antenna and configured to acquire sensor data regarding the microwave radiation emitted from an internal portion of the target. A processing device, included in the thermal sensing device, can be configured to produce thermal data based on the sensor data.

18 Claims, 6 Drawing Sheets

(56) References Cited

U.S. PATENT DOCUMENTS

2010/0194625 A1* 8/2010 Koch .................... G01V 8/005
                                                    342/174
2012/0254208 A1* 10/2012 Duvoisin, III .......... G01S 7/003
                                                    707/758

OTHER PUBLICATIONS

Hand et al., "Monitoring of deep brain temperature in infants using multi-frequency microwave radiometry and thermal modelling", Physics in Medicine and Biology, vol. 46, 2001, pp. 1885-1903.

* cited by examiner

SYSTEMS AND METHODS FOR MICROWAVE SENSING OF OBJECT PROPERTIES

BACKGROUND

In many applications, it is desirable to determine the surface and/or internal properties of an object. A remote sensing device may include sensors which measure electromagnetic radiation emitted or reflected from an object to be imaged. A remote sensing device may also include an electromagnetic radiation source for irradiating an object to be imaged. Using sensors and emitters an image of an object may be generated based on the detected electromagnetic radiation. This may include applying algorithms to construct the image from data gathered at multiple points of the object.

SUMMARY

One embodiment relates to a thermal sensing device which can include an electromagnetic radiation source configured to generate electromagnetic radiation, a first antenna configured to direct electromagnetic radiation generated by the radiation source toward a target, and a second antenna configured to receive microwave radiation emitted from an internal portion of the target. The thermal sensing device can also include a microwave sensor coupled to the second antenna and configured to acquire sensor data regarding the microwave radiation emitted from an internal portion of the target. A processing device, included in the thermal sensing device, can be configured to produce thermal data based on the sensor data.

Another embodiment relates to a microwave thermal sensing device. The microwave thermal sensing device can include a microwave source configured to generate microwave radiation and direct the microwave radiation toward a target and a microwave sensor configured to acquire sensor data based on detecting and measuring microwave radiation emitted from an internal portion of the target. The microwave thermal sensing device can further include a processing device configured to produce thermal data based on the sensor data.

Another embodiment relates to an imaging thermal sensing device which can include a microwave source configured to generate microwave radiation and a microwave detector. The microwave detector can be configured to acquire sensor data based on detecting and measuring microwave radiation emitted from an internal portion of a target. An antenna can be coupled to the microwave source and to the microwave detector and configured to emit microwaves at a first set of time values and receive microwaves at a second set of time values. The first set of time values and the second set of time values may define mutually exclusive and alternating time periods. The imaging thermal sensing device may further include a processing device configured to provide thermal data of the target based on the sensor data.

Another embodiment relates to a method for thermal sensing of a target using microwaves. The method can include directing electromagnetic radiation towards a target, sensing microwaves emitted from an interior portion of the target, and applying an algorithm to microwave data generated by sensing the microwaves from the target. The method may further include generating thermal data corresponding to the interior portion of the target, wherein the thermal data is generated based on application of the algorithm to the microwave data.

Another embodiment relates to a method for imaging a target. The method may include irradiating a target with microwaves at a first set of time values and acquiring data corresponding to sensed microwaves emitted from an internal portion of the target in response to irradiating microwaves at a second set of time values. The values of the first set of times and values of the second set of times may define mutually exclusive and alternating time periods. The method may further include producing an image of the target based on data generated by sensing the microwaves from the internal portion of the target.

The foregoing summary is illustrative only and is not intended to be in any way limiting. In addition to the illustrative aspects, embodiments, and features described above, further aspects, embodiments, and features will become apparent by reference to the drawings and the following description.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Generally, a thermal sensing device uses radiation to detect and sense the temperature of objects. The radiation may be emitted by the remote thermal sensing device actively. This radiation may bombard the target object to be sensed. This may impart energy to the target causing it to release thermal radiation. The radiation released by the target is sensed by the remote thermal sensing device. The remote thermal sensing device uses this sensed radiation to construct a thermal image of the target. The remote thermal sensing device may also sense a target passively by sensing the thermal radiation the target object emits naturally. Then, the remote thermal sensing device uses this sensed radiation to determine thermal data and construct a thermal image of the target.

Figure 1:
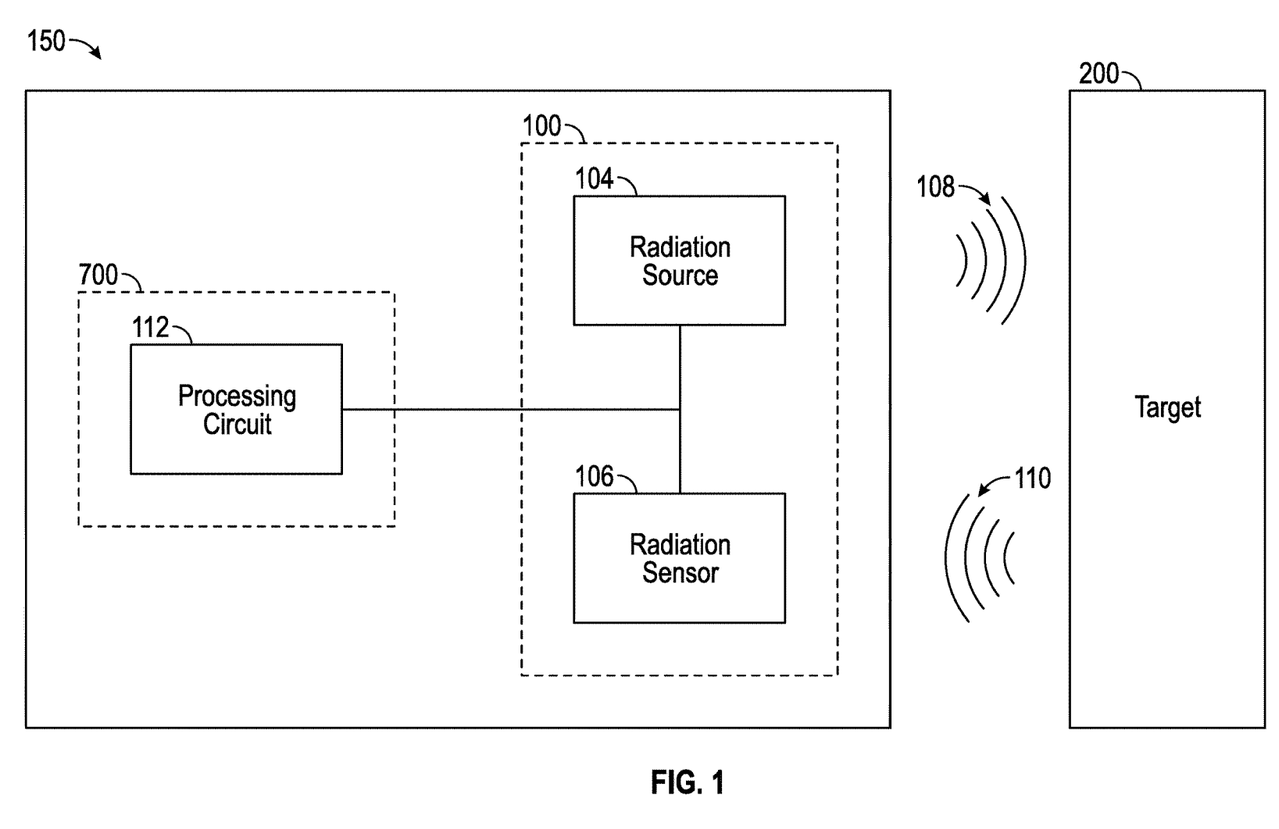
FIG. 1 is a schematic view of one embodiment of an imaging device.

Referring to FIG. 1, an embodiment of thermal sensing device 150 is shown. Thermal sensing device 150 may include radiation source 104, microwave sensor 106, and processing circuit 112. Radiation source 104 may produce electromagnetic radiation for use in imaging target 200. For example, radiation source 104 may produce visible light, infrared radiation, microwave radiation, etc. Electromagnetic radiation 108 may irradiate target 200 such that target 200 emits microwave radiation 110 in response. Target 200 may be heated (e.g., warmed by the absorbed radiation such that the temperature of the target increases) by the irradiating electromagnetic radiation. Microwave radiation 110 may also be emitted by target 200 without prior irradiation (e.g., naturally occurring microwave radiation emissions). Microwave radiation 110 emitted by target 200 (naturally or in response to radiation) may be sensed by microwave senor 106. For example, microwave sensor 106 may be a radiometer. Microwave sensor 106 may comprise a microwave frequency filter, an amplifier, a resonant circuit, or the like. In some embodiments, radiation source 104 and microwave sensor 106 are part of sensing device 100. Sensing device 100 may be a component of thermal sensing device 150. Sensing device 100 may include other components described herein. In some embodiments, sensing device 100 may be located remote from other components of thermal sensing device 150.

In one embodiment, processing circuit 112 controls radiation source 104 and/or microwave sensor 106 (e.g., to determine the parameters of the electromagnetic radiation generated and/or control the area of target 200 which is sensed). In some embodiments, microwave sensor 106 sends information about sensed microwaves 110 emitted by target 200. Using this information, processing circuit 112 may generate a thermal image of target 200. In some embodiments, processing circuit 112 is a component of image processing device 700. Image processing device 700 may include other components as described herein. In some embodiments, image processing device 700 is located remotely from other components (e.g., sensing device 100) of thermal sensing device 150.

Figure 2:
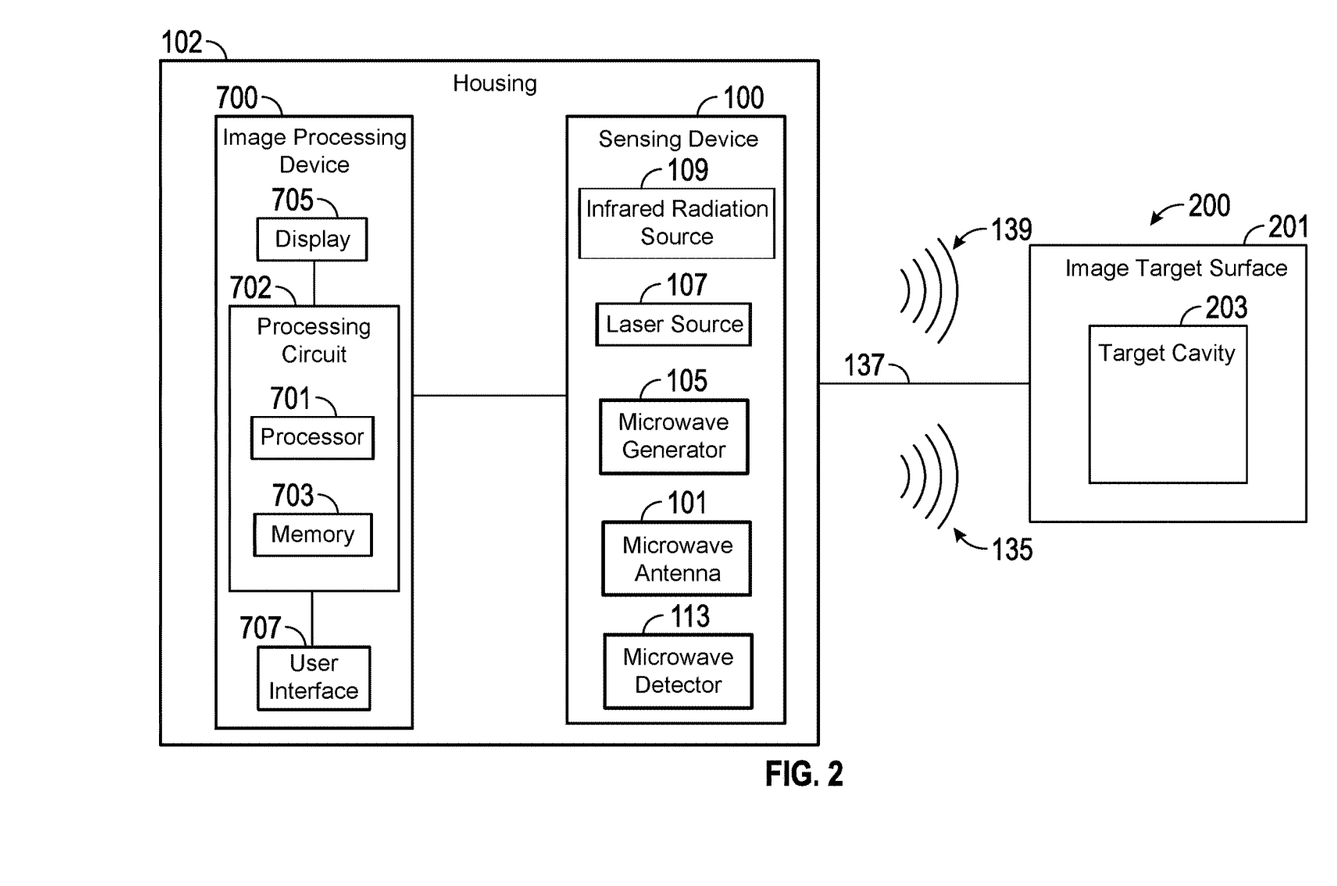
FIG. 2 is a schematic view of one embodiment of a microwave imaging device.

Referring to FIG. 2, one embodiment of thermal sensing device 150 is shown. Thermal sensing device 150 includes a sensing device 100. In the illustrated embodiment, sensing device 100 houses microwave antenna 101, microwave detector 113, which may be coupled to microwave antenna 101, and microwave generator 105, which is capable of producing microwaves 135. In some embodiments, microwave generator 105 is coupled to microwave antenna 101. In the illustrated embodiment, sensing device 100 also houses infrared radiation source 109 capable of producing infrared radiation 139, and laser source 107 capable of producing laser beam 137.

Sensing device 100 may include housing 102. Housing 102 houses the elements of thermal sensing device 150 related to generating radiation for use in thermally imaging a target, detecting radiation, and/or related support devices. Housing 102 may protect the elements housed therein from damage and interference. In some embodiments, housing 102 shields the elements within from electromagnetic radiation. Housing 102 may also prevent tampering with the elements therein. In some embodiments, housing 102 allows for controlled access to the components therein. For example, housing 102 may include a locking hatch. Housing 102 also allows for certain types of ingress and/or egress. In some embodiments, housing 102 allows for the emission of electromagnetic radiation. For example, housing 102 may allow an antenna to protrude from within housing 102. In some embodiments, housing 102 has a section made of a material which allows the transmission of electromagnetic radiation. For example, housing 102 may have a glass section from which electromagnetic radiation may be emitted. In some embodiments, housing 102 allows electromagnetic radiation emitted from or reflected from a target to enter housing 102. For example, housing 102 may allow an antenna to protrude from within housing 102. In some embodiments, housing 102 has a section made of a material which allows electromagnetic radiation to enter housing 102. For example, a waveguide may protrude from housing 102.

In the illustrated embodiment, infrared radiation source 109 generates infrared electromagnetic radiation. Infrared radiation source 109 is configured such that it may emit infrared radiation in a targeted manner. In some embodiments, infrared radiation source 109 irradiates target 200 or a particular portion of target 200. In some embodiments, infrared radiation source 109 emits infrared radiation 139 broadly (i.e. not targeted to irradiate a particular target 200 or portion of target 200). In some embodiments, infrared radiation source 109 emits infrared radiation 139 with the use of an antenna. The antenna may comprise a beam director, a projector, a lens, a mirror, a diffractive optic, etc. Infrared radiation source 109 may be capable of producing infrared radiation of varying frequencies within the infrared spectrum of electromagnetic radiation. Infrared radiation source 109 may be tunable. In some embodiments, infrared radiation source 109 is configured to produce pulses of infrared radiation 139. The pulse width may be selected. The pulse width may also be varied over time. In some embodiments, infrared radiation source 109 is configured to produce infrared radiation 139 with varying wavelengths. For example, infrared radiation source 109 may produce infrared radiation 139 at a first wavelength at a first time and produce infrared radiation 139 at a second wavelength at a second time.

In some embodiments, sensing device 100 includes a laser source 107. Laser source 107 may produce electromagnetic radiation through light amplification by stimulated emission of radiation. Laser source 107 may also be configured to emit electromagnetic radiation in the form of laser beam 137. Laser beam 137 may be narrowly or broadly focused. For example, laser beam 137 may be a pencil beam targeted such that it irradiates a portion of target 200. Laser beam 137 may also be broadly focused such that the emitted electromagnetic radiation irradiates all or a large portion of target 200. Laser beam 137 may be directed towards the target (or a specified location within it) by use of a beam director, a projector, a lens, a mirror, a diffractive optic, or the like. In some embodiments, laser source 107 produces electromagnetic radiation of varying wavelengths. For example, laser source 107 may be one or more of an infrared laser, visible laser, ultraviolet laser, X-ray laser, free electron laser, etc. Laser source 107 may be configured to produce electromagnetic radiation of varying wavelengths within one spectrum of electromagnetic radiation (e.g., visible light). In some embodiments, laser source 107 is configured to produce pulses of electromagnetic radiation. The pulse width may be selected. The pulse width may also be varied over time. In some embodiments, laser source 107 is configured to produce electromagnetic radiation of varying wavelengths. For example, laser source 107 may produce laser beam 137 at a first wavelength at a first time and produce laser beam 137 at a second wavelength at a second time. Other sources of electromagnetic radiation in the visible or other light spectrums may be included in sensing device 100. Sensing device 100 can further include an optical antenna. The optical antenna can be used to emit electromagnetic radiation used in irradiating target 200. In some embodiments, the optical antenna includes at least one of a lens, a mirror, a diffractive optic, a beam director, and an optical projector.

With continuing reference to FIG. 2, sensing device 100 may include microwave generator 105. Microwave generator 105 may produce electromagnetic radiation in the microwave spectrum. For example, microwave generator 105 may be one or more of a magnetron, klystron, traveling-wave tube, gyrotron, Gunn diode, etc. In some embodiments, microwave generator 105 is configured such that the emitted microwaves 135 may be broadly emitted or emitted in a targeted manner. The microwave beam produced may be narrowly or broadly focused. The emitted microwaves 135 may broadly irradiate all or a large portion of target 200. The emitted microwaves 135 may be targeted such that only a portion of target 200 is irradiated. In some embodiments, this is accomplished through the use of microwave antenna 101. Microwave generator 105 may produce microwaves 135 of varying frequencies within the microwave spectrum of electromagnetic radiation. For example, microwave generator 105 may first produce microwaves in the S band and subsequently produce microwaves in the X band. Microwave generator 105 may be tunable to produce microwaves of various frequencies. In some embodiments, microwave generator 105 is configured to produce pulses of microwaves 135. The pulse width may be selected. The pulse width may also be varied over time. In some embodiments, microwave generator 105 is configured to produce microwaves 135 with varying wavelengths. For example, microwave generator 105 may produce microwaves 135 at a first wavelength at a first time and produce microwaves 135 at a second wavelength at a second time.

Microwaves 135 emitted by sensing device 100 may be selected depending on the target 200 to be imaged. Microwaves 135 emitted by sensing device 100 may be of a particular one or more wavelengths selected to irradiate a particular portion of target 200. For example, shorter wavelength microwaves 135 may be emitted by sensing device 100 to image target surface 201. Longer wavelength microwaves 135 may be emitted by sensing device 100 to image target cavity 203. Similarly, different microwave frequencies may be selected for the emitted microwaves 135 depending on the target to be imaged. The pulse width of the microwave pulses emitted by sensing device 100 may also be varied depending on the target. For example, a variety of pulse widths may be used to irradiate target 200 in order to measure the temperature response over time of target 200. The temperature of target 200 may increase (e.g., one tenth of a degree Celsius) in response to absorbing electromagnetic (e.g., microwave) radiation emitted by sensing device 100. Over time, the temperature of target 200 will decrease once target 200 stops absorbing radiation (e.g., after sensing device 100 ceases to emit radiation). The varied radiation pulse widths and the resulting sensed response of target 200 may be used to characterize the materials which make up target 200. In other words, target 200 is warmed and the response is measured by sensing device 100 to determine the material properties of target 200. Other parameters of the microwaves may be altered depending on the application, target characteristics, value to be measured, etc. For example, the amplitude, power, intensity, phase, etc. of the microwaves emitted by sensing device 100 may be selected according to various alternative embodiments.

Microwave antenna 101 may be used for the emission (e.g., the direction) of microwaves towards a target or a specified internal portion of it. Microwave antenna 101 may be used to detect microwaves from target 200. The microwaves may be emitted by target 200. In some embodiments, a single microwave antenna 101 may be used both for the emission of microwaves from microwave generator 105 and collection/detection of microwaves. The microwave antenna 101 may be switched between emission and detection uses. For example, microwave generator 105 and microwave antenna 101 may be configured to emit microwaves 135 at set intervals. Between intervals of microwave emission, the microwave antenna 101 and microwave detector 111 may be used to sense the microwaves emitted from target 200. The microwave antenna 101 is any antenna suitable for transmitting and/or receiving microwaves.

In some embodiments the microwave antenna 101 is any antenna suitable for both transmission of and reception of microwaves. For example, microwave antenna 101 may be one or more of a long wire antenna, parabolic antenna, directional antenna, omnidirectional antenna, pencil-beam antenna, flared-beam antenna, antenna array, patch antenna, phase array (dynamic, fixed, active, and/or passive), focal plane array, metamaterial surface array, etc. In some embodiments, microwave antenna 101 physically scans. In other embodiments, microwave antenna 101 uses electronic scanning. In some embodiments, thermal sensing device 150 utilizes compressive imaging via microwave sensing following spatially patterned irradiation of the target by electromagnetic radiation. One or a combination of these techniques may be used by sensing device 100, alone or in conjunction with image processing device 700, to produce an image of target 200 with microwave thermometry imaging. Microwave antenna 101 may be focused to generate data corresponding to a particular location. Using data from multiple locations, image processing device 700 may construct a thermal image of target 200. In some embodiments (e.g., when microwave antenna 101 is an array), target 200 may be imaged without scanning.

In some embodiments, sensing device 100 uses active imaging techniques to gather data regarding target 200. Sensing device 100 may use microwave antenna 101 to irradiate target 200 and to measure the resulting microwaves emitted by target 200. The microwaves may be detected with microwave detector 113. In other embodiments, sensing device 100 uses passive imaging techniques to gather data regarding target 200. Sensing device 100 may receive microwaves emitted from target 200 without first irradiating target 200. The microwaves may be received by microwaves antenna 101 and detected with microwave detector 113.

With continued reference to FIG. 2, target 200 is illustrated. Target 200 is the object or objects to be imaged by sensing device 100. Target 200 includes target surface 201. Target surface 201 is the surface of target 200. In some embodiments, target surface 201 includes areas immediately in contact with target 200 and/or objects in contact with target 200. For example, target surface 201 may be the skin of a person. In that case, target surface 201 may include objects on the person. For example, target surface 201 may include clothing and objects contained within and/or covered by clothing. Target surface 201 may also include objects otherwise attached to the body of a person. In some embodiments, target surface 201 includes objects such as knives, guns, explosives, contraband (e.g., a recreational drug, a precious metal, a gem, a smuggled object, and an illegal substance), etc. In some embodiments, target 200 includes target cavity 203. Target cavity 203 is a space partially or entirely enclosed by target surface 201. For example, target cavity 203 may be the mouth, chest cavity, rectum, or other body cavity. Target 200 gives off thermal (e.g., black body) radiation which may be measured by sensing device 100. Target 200, including target surface 201 and/or target cavity 203, may be irradiated by sensing device 100. Some electromagnetic waves used to irradiate target 200 may be absorbed by part or all of target 200. In response, target 200 may emit electromagnetic radiation (e.g., thermal radiation) that may be measured by sensing device 100.

The embodiment of thermal sensing device 150 depicted in FIG. 2 further includes a microwave detector 113. Microwave detector 113 detects characteristics of microwaves emitted by target 200 for use in imaging target 200. In one embodiment, microwave detector 113 measures the frequency of the microwaves emitted from the target 200. In some embodiments, microwave detector 113 uses electronic techniques to measure the frequency of the microwaves. For example, microwave detector 113 may be a frequency counter, heterodyne, superheterodyne, or other device for electronically measuring the frequency of microwaves. In some embodiments, microwave detector 113 uses mechanical techniques to measure the frequency of the microwaves. In further embodiments, microwave detector 113 is or includes a radiometer. Microwave detector 113 may measure the energy of the microwaves emitted by target 200, the temperature of the target 200, the wavelength of the microwaves, the phase of the microwaves, the intensity of the microwaves detected, brightness and/or brightness temperature, etc. In some embodiments, microwave detector 113 produces a voltage corresponding to the parameter being measured. In other embodiments, microwave detector 113 outputs a measurement signal containing information describing one or more of the above listed or other measured characteristics of the detected microwaves. Microwave detector 113 may be configured to measure one or all of the above parameters and any other parameters used in determining the temperature of target 200. In some embodiments, microwave detector 113 and/or image processing device 700 are configured to calculate one or more of the above characteristics or parameters from a measured characteristic or parameter. For example, the wavelength of detected microwaves may be calculated using the measured frequency of the detected microwaves and the relationship with the speed of light.

Sensing device 100 may further include support elements not shown in FIG. 2. These elements may include devices which support the operation of the above described elements. In some embodiments, the support elements include power supplies. For example, the sensing device 100 may include batteries, transformers, power supplies, direct current connections, alternating current connections, etc. In some embodiments, the support elements include protection devices. For example, the sensing device 100 may include fuses, breakers, etc. In some embodiments, the support elements include devices for managing electromagnetic radiation. For example, the sensing device 100 may include waveguides, electromagnetic shielding, coaxial cable, antennas, etc. An antenna may be used in conjunction with one or more of infrared radiation source 109, laser source 107, and/or microwave generator 105 to perform the above described functions. In some embodiments, sensing device 100 may also include signal processing circuitry. This circuitry may be used for signal processing or preprocessing prior to communication of the signal and/or data to image processing device 700.

The embodiment of thermal sensing device 150 depicted in FIG. 2 also includes image processing device 700. Image processing device 700 may include processing circuit 702, display 705, and/or user interface 707 to process data from sensing device 100 and/or generate an image of target 200. In some embodiments, image processing device 700 uses data gathered by sensing device 100 to construct an image of the target. The image may include an image of target surface 201 and/or target cavity 203. In some embodiments, image processing device 700 uses previously gathered and stored data to generate the image. Processing circuit 702 may include processor 701 and memory 703. Processor 701 may be implemented as a general-purpose processor, an application specific integrated circuit (ASIC), one or more field programmable gate arrays (FPGAs), a digital-signal-processor (DSP), a group of processing components, or other suitable electronic processing components. Memory 703 may be one or more devices (e.g., RAM, ROM, Flash Memory, hard disk storage, etc.) for storing data and/or computer code for facilitating the various processes described herein. Memory 703 may be or include non-transient volatile memory or non-volatile memory. Memory 703 may include database components, object code components, script components, or any other type of information structure for supporting various activities and information structures described herein. Memory 703 may be communicably connected to processor 701 and provide computer code or instructions to processor 701 for executing the processes described herein.

In some embodiments, image processing device 700 receives data regarding the microwaves detected by microwave detector 113. This data may include characteristics of the microwaves detected such as frequency, wavelength, phase, etc. The data may also include characteristics regarding the detected microwaves which have been calculated. For example, the data may include intensity of the microwaves, power of the microwaves, brightness of the microwaves, etc. In some embodiments, the microwave detector 113 calculates these characteristics. In other embodiments, image processing device 700 receives data from microwave detector 113 and makes these calculations. In further embodiments, image processing device 700 receives a digital or analog signal from microwave detector 113 corresponding to detected microwaves. For example, this signal may be in the form of voltage over time. Image processing device 700 may use signal quantization to convert the signal into another form. In some embodiments, image processing device 700 digitizes the signal and/or data received from microwave detector 113. In other embodiments, image sensing device 100 digitizes and/or performs signal quantization before sending data to image processing device 700.

Image processing device 700 may use microwave thermometry to generate a thermal image of target 200 based on the detected microwaves from target 200. This may include assembling data regarding a plurality of portions of target 200 into an image of a larger portion of or the entirety of target 200. This may be accomplished through the use of one or more algorithms.

In some embodiments, image processing device 700 uses algorithms to perform digital signal processing. Digital signal processing algorithms may be applied to the signals and/or data from sensing device 100. This may include signal sampling, eliminating or reducing signal noise, analyzing data in multiple domains, etc. Algorithms may also be used by image processing device 700 to conduct digital imaging processing. This may include classification, feature extraction, pattern recognition, multi-scale signal analysis, etc. For example, algorithms performing digital signal analysis may be used by image processing device 700 to characterize an object as a threat object. Image processing device 700 may use algorithms to generate an image of the target. In some embodiments, this image is two dimensional (e.g., the surface of the target such as a person's skin, objects thereon, a person's clothing or objects covered by clothing, objects in a person's pockets, etc.). In some embodiments, this image is three dimensional (e.g., includes the above and body cavities, objects in body cavities, etc.). To generate an image of a portion of or the entirety of target 200, image processing device 700 may use algorithms to assemble data related to a plurality of portions of target 200 (e.g., temperature, brightness, power, etc.) based on the location of the portion. For example, the signal and/or data from sensing device 100 may include information as to which portion of target 200 is being sensed. This may include x, y, and/or z coordinates of a portion of target 200. This data may allow image processing device 700 to assemble data regarding a plurality of portions of target 200 into a two or three dimensional set of data regarding the plurality of portions of target 200 which have been sensed. In other embodiments, sensing device 100 may apply algorithms to the data. After image processing device 700 has applied algorithms, image processing device 700 may produce an image. Producing an image may include displaying the image on display 705, applying color rendering methods to generate a false color image of the object and/or target 200, using algorithms to assemble image data corresponding to imaged cells of target 200, etc.

In some embodiments, image processing device 700 calculates the heat capacity and/or thermal diffusivity of one or more portions of target 200 corresponding to a set of data or a portion of a signal received from sensing device 100. Image processing device 700 may also calculate parameters such as brightness (e.g., the brightness of a portion of target 200 may be calculated using the power received by microwave antenna 101 and detected by microwave detector 113). In some embodiments, the actual temperature of a portion of target 200 may be calculated (e.g., the actual temperature may be calculated from the brightness). The heat capacity, brightness, and/or thermal diffusivity of portions of target 200 may be used for functions including generating an image of the entirety of or a portion of target 200 based on differences in these parameters across portions of target 200, determining the material makeup of a portion of target 200, characterizing an object (e.g., identifying an object as a particular object or type of object), etc. In some embodiments, identifying an object includes looking up a measured property in a table of properties corresponding to different materials and/or objects. Identifying an object may include categorizing an object based on its detected properties. In some embodiments, the brightness temperature, apparent temperature, and/or antenna temperature for each detected portion of target 200 are determined. The temperature may then be used to construct an image of target 200 based on temperature variations corresponding to different portions of target 200 which have been targeted for microwave detection using microwave detector 113 and microwave antenna 101. The portions of target 200 may include the surface of target 200 and/or internal portions of target 200 (e.g., microwaves of penetrating wavelengths may be used to irradiate a portion of target 200 at a specific depth and the resulting emitted microwaves may be detected with microwave antenna 101 and microwave detector 113). The temperature data corresponding to each portion of target 200 may then be used to generate a thermal image of a larger portion of or the entirety of target 200. In some embodiments, the calculations and related functions used to generate a thermal image of target 200 are performed using processor 701 and memory 703 of image processing device 700. In some embodiments, processor 701 and memory 703 are components within image sensing device 150 and are used to perform the above described functions.

Image processing device 700 may also include display 705. In some embodiments, display 705 allows a user of thermal sensing device 150 to view information pertaining to the imaging device. Display 705 may show a thermal image of the target 200. In some embodiments, display 705 shows operating information regarding the imaging device. For example, display 705 may show the operator of thermal sensing device 150 a variety of parameters used in the imaging. This may include what irradiating source is used to irradiate the target 200 (e.g., laser source 107, microwave generator 105, infrared radiation generator 109, etc.). The display 705 may also show the operator of thermal sensing device 150 information such as the frequency of electromagnetic radiation being used, the wavelength of the electromagnetic radiation being used, the depth at which the target 200 is being imaged, the 3-D location of target 200 being thermally sensed, pulse width or widths of the irradiating electromagnetic radiation, etc. Display 705, in conjunction with user interface 707, may also allow the operator of thermal sensing device 150 to interact with the imaging device. For example, display 705 may show the operator parameters that he or she is adjusting. In some embodiments, display 705 is one or more of a plasma panel, liquid crystal display, light emitting diode display, organic light emitting diode display, cathode ray tube display, etc.

In some embodiments, user interface 707 is an input mechanism which allows the operator of thermal sensing device 150 to interact with the imaging device. In some embodiments, the user interface 707 includes a plurality of buttons, switches, knobs, and/or levers. In other embodiments, the user interface 707 includes a keyboard and/or mouse. The user interface 707 may include a touch controlled panel (e.g., capacitive touch interface). In some embodiments, part of or the entirety of display 705 and user interface 707 are combined into a touch screen (e.g., capacitive touch screen). The input mechanisms of user interface 707 may be generic or customized for use with the imaging device. For example, user interface 707 may be a standard keyboard and mouse. User interface 707 may also include buttons, switches, knobs, and/or levers which are specific to thermal sensing device 150 (e.g., a knob for adjusting the frequency of the irradiating electromagnetic radiation, buttons to switch between infrared radiation, microwaves, or laser radiation, etc.). User interface 707 and/or image processing device 700 may also send control signals to sensing device 100. For example image processing device 700 may send a signal to image sensing device 100 which selects a mode of operation (e.g., passive scanning, active scanning, 2D, 3D, etc.).

In the depicted embodiment of FIG. 2, image processing device 700 is not within sensing device 100. Image processing device 700 and sensing device 100 are shown connected to each other. This connection may allow for the transfer of data (e.g., measurements recorded by microwave detector 113, operation commands to microwave generator 105, operation commands to microwave antenna 101, etc.). In some embodiments, the connection also allows for the sensing device 100 and image processing device 700 to share a single power supply. In some embodiments, the connection is wireless. In some embodiments, image processing device 700 is located within sensing device 100. In other embodiments, sensing device 100 performs the functions of image processing device 700 (e.g., signal processing, image processing, producing an image, displaying an image, etc.). In that case, sensing device 100 may also include elements depicted as being included within image processing device 700. For example, image sensing device 100 may include processor 701, memory 703, display 705, user interface 707, etc.

Figure 3:
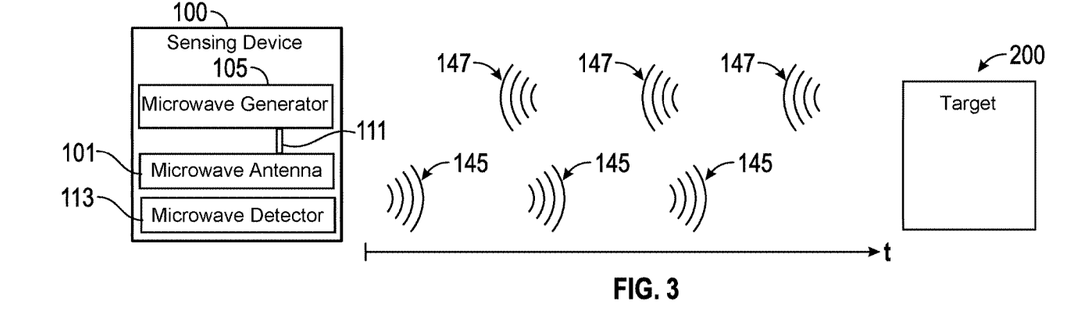
FIG. 3 is a schematic view of one embodiment of a microwave imaging device showing synchronized warming and imaging of a target.

Referring now to FIG. 3, a schematic view illustrates a mode of operation of sensing device 100 according to one embodiment. In some embodiments, sensing device 100 includes microwave antenna 101, microwave detector 113, and waveguide 111 which couples microwave antenna 101 to microwave generator 105. Sensing device 100 may be configured to emit microwaves 145 to irradiate target 200 and receive microwaves 147 from target 200 with a single microwave antenna 101.

In some embodiments, microwave generator 105 is configured to generate electromagnetic radiation in the microwave spectrum. The electromagnetic radiation generated by microwave generator 105 may be transferred to microwave antenna 101 using waveguide 111. Microwave antenna 101 may be configured to produce a focused beam of microwave radiation. For example, microwave antenna 101 may produce a pencil beam of microwave radiation (e.g., microwave antenna 101 is a parabolic antenna). Microwave antenna 101 may be physically or electronically scanned.

In the illustrated embodiment, sensing device 100 is configured to irradiate target 200 and detect microwaves with the same microwave antenna 101. At a first time, microwave antenna 101 emits microwaves from sensing device 145. The microwaves from the sensing device 145 irradiate target 200. At a second time, microwave antenna 101 receives microwaves from target 147. At the second time, microwave antenna 101 is connected to microwave detector 113 which measures the microwaves from target 200. This sequential operation, where sensing device 100 emits microwaves and then senses microwaves, continues for a specified time. In some embodiments, the time is set by image processing device 700 or the operator of the imaging device. In other embodiments, the time is set using sensing device 100. This may allow for a single antenna to be used for both irradiating target 200 and for imaging target 200. Sensing device 100 may not be simultaneously emitting microwaves and measuring microwaves. In some embodiments, the thermal imaging is done by broad beam warming with spatially resolved reception. In other embodiments, the thermal imaging is accomplished using spatially resolved warming and single-pixel reception (e.g., compressive imaging). The microwave antenna 101 may be a variable beamwidth antenna. Microwave source 105 may be configured to emit electromagnet radiation at a first set of time values and microwave detector 113 may be configured to sense electromagnetic radiation at a second set of time values. The first set of time values and the second set of time values are mutually exclusive.

Figure 4:
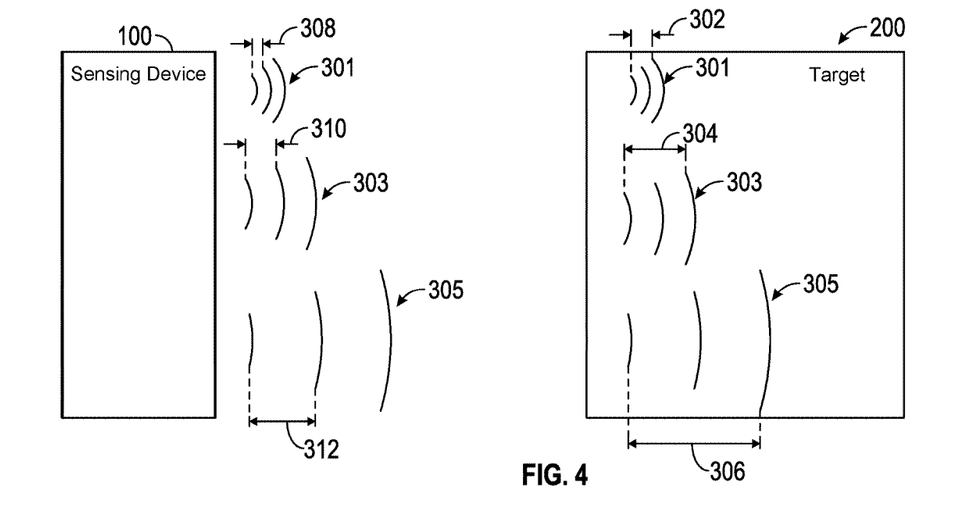
FIG. 4 is a schematic view of one embodiment of a microwave imaging device showing the use of microwaves of varying wavelength.

Referring to FIG. 4, a schematic view illustrates a mode of operation of sensing device 100 according to another embodiment. In this embodiment, sensing device 100 is configured to produce and emit microwaves of varying wavelengths. For purposes of illustration, sensing device 100 is depicted emitting microwaves of three different wavelengths: microwaves 301 of short wavelength, microwaves 303 of intermediate wavelength, and microwaves 305 of long wavelength. For example, microwaves 301 of short wavelength may have wavelength 308 in the D band of microwave frequencies, microwaves 303 of intermediate wavelength may have wavelength 310 in the F band of microwave frequencies, and microwaves 305 of long wavelength may have wavelength 312 in the W band of microwave frequencies. Sensing device 100 may be configured to produce microwaves of a plurality of wavelengths and is not limited to producing microwaves of three different wavelengths. Microwaves 301 of short wavelength penetrate target 200 to a shallow depth 302. Microwaves 303 of intermediate wavelength penetrate target 200 at an intermediate depth 304. Microwaves 305 of long wavelength penetrate target 200 to a greater depth 306. Using microwaves of varying wavelengths (e.g., wavelengths 308, 310, and 312), sensing device 100 may produce an image of target 200 that includes internal features of target 200. As microwaves of differing wavelengths will penetrate the target to a different depth, sensing device 100 may collect data regarding the material marking up target 200 throughout the depth of target 200. For example, irradiating target 200 with microwaves 301 of a short wavelength will cause the microwaves to penetrate to a shallow depth 302. The materials of target 200 at the shallow depth 302 will absorb some of the microwave radiation and increase in temperature. Sensing device 100 may then measure the microwaves emitted by target 200 due to the absorbed radiation at depth 302. This technique may then be repeated for various depths. For example, various wavelengths may be used to image a target's clothing (e.g., does the target have dangerous materials in his or her pockets) and/or body cavities (e.g., is the target concealing dangerous materials within his or her body). In other embodiments, a two dimensional image of the target is generated by image processing device 700 using the information gathered by sensing device 100. In this case short wavelength microwaves may be used to image just the surface of the target 201. In some embodiments, microwaves of different frequencies may be used for irradiating the target than are detected for sensing thermal radiation emitted by the target; use of different frequencies may permit sensing device 100 to perform simultaneous irradiation and thermal sensing.

Figure 5A:
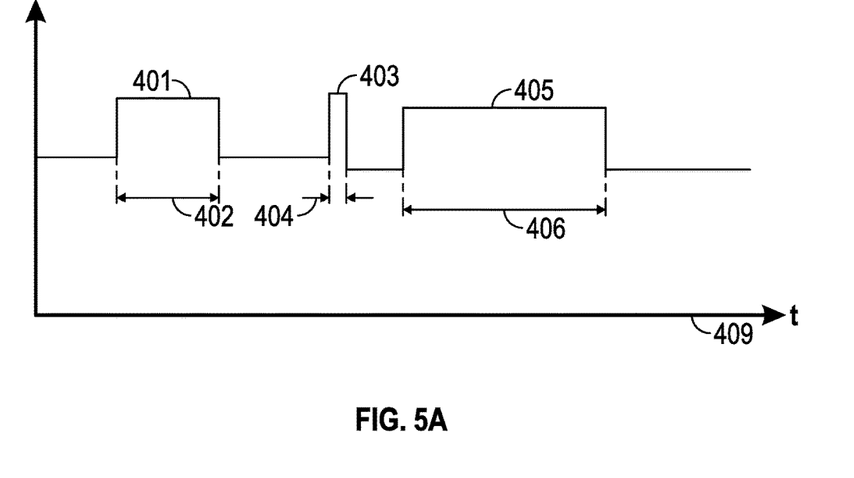
FIG. 5A is a schematic view according to one embodiment of a microwave imaging device showing microwaves emitted according to varying pulse widths.

Referring to FIG. 5A, a schematic view illustrates an additional mode of operation of sensing device 100 according to one embodiment. In this embodiment, sensing device 100 is configured to emit microwaves in pulses of varying pulse width at different times. Pulse widths and the time at which they are emitted are illustrated in relation to time axis 409. In some embodiments, the microwaves are emitted for a period of time and then no microwaves are emitted. As previously discussed, this may permit for the intermittent measurement of the target between successive emissions of microwaves by sensing device 100. By varying the pulse width of the emission of microwaves, further information about target 200 may be gathered by sensing device 100 and image processing device 700. In the illustrated embodiment, sensing device 100 is configured to produce a first medium pulse 401 of microwaves with first pulse width 402. Sensing device 100 may further produce a second short pulse 403 of microwaves with second pulse width 404 and a third long pulse 405 of microwaves with third pulse width 406.

Figure 5B:
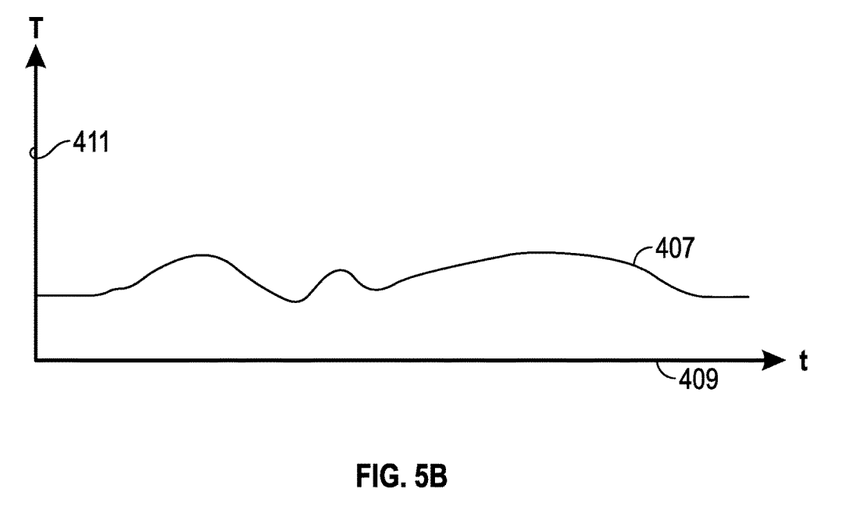
FIG. 5B is a schematic view according to one embodiment of a microwave imaging device showing a time-temperature response of the target resulting from microwaves emitted according to varying pulse widths.

With reference to FIG. 5B, sensing device 100 may measure the temperature response 407 of target 200 which results from microwave pulses. The illustrated temperature response 407 shows an exemplary response relative to time axis 409 and temperature axis 411 corresponding to the microwave pulses illustrated in FIG. 5A. Using the temperature response of target 200, or a portion of target 200, sensing device 100 may characterize the material which makes up target 200, or a portion thereof. In some embodiments, sensing device 100 and/or image processing device 700 uses microwave thermometry to measure the time-dependent thermal response. In some embodiments, microwave emissions with varying pulse widths are used to distinguish between normal temperatures (e.g., temperatures before irradiation by the sensing device) and increased temperatures of target 200 due to irradiation by sensing device 100. In other embodiments, sensing device 100 characterizes the material makeup of the target based on the calculated heat capacity and/or thermal diffusivity. The heat capacity and/or thermal diffusivity may be calculated from the measured temperature response corresponding to irradiating microwaves of varying pulse widths. In some embodiments, target 200 is irradiated with a different spectrum of electromagnetic radiation. Sensing device 100 may gather the information for this calculation using microwave detector 113. In some embodiments, sensing device 100 then transmits this information to image processing device 700 using communications device 115 and communications connection 125. Image processing device 700 may calculate the heat capacity and/or diffusivity of a target. Image processing device 700 may use this information to infer that target 200 or a section of target 200 is a particular material. In other embodiments, sensing device 100 uses the temperature response of target 200 to calculate the heat capacity and/or thermal diffusivity of target 200 or a portion thereof. Sensing device 100 may also use this information to infer the material makeup of target 200 or a portion thereof.

For example, sensing device 100 may irradiate target 200 in a first region of target 200 using microwaves with a first pulse 401 having width 402. Sensing device 100 may then measure, over time, the microwaves emitted by target 200 as a response to the irradiating microwaves with a first pulse width 402. Sensing device 100 may collect information using microwave antenna 101 and microwave detector 113, such as the frequency, wavelength, power, intensity, etc. of the microwaves emitted by the portion of target 200. In some embodiments, sensing device 100 then irradiates the same portion of target 200 using microwaves of a different pulse width, frequency, wavelength, etc. This step may be repeated until all desired information is gathered regarding the portion of target 200. In some embodiments, after irradiating and measuring a first portion of target 200, sensing device 100 irradiates and measures one or more different portions of target 200. This process may be repeated until all or a portion of target 200 is irradiated and measured. The data generated may then be processed by image processing device 700 to create an image of the all or a portion of target 200 and to provide information such as the material makeup of the target, characterizing materials found on or within the target, characterization of threat objects in body cavities, etc. Detected objects may be characterized as threat objects by comparing the measured heat capacity and/or thermal diffusivity to known values for threat objects such as weapons, explosives, etc. If the measured values match, within a tolerance, the known values then the object may be characterized as a threat object. Detected objects may be characterized as contraband objects (e.g., a recreational drug, a precious metal, a gem, a smuggled object, or an illegal substance) by comparing the measured heat capacity and/or thermal diffusivity to known values for contraband objects such as recreational drugs, gems, precious metals, specified illegal or smuggled objects, etc. If the measured values match, within a tolerance, the known values then the object may be characterized as a contraband object. In some embodiments, these functions are performed by sensing device 100.

Continuing the example, sensing device 100 may irradiate internal cavity 203 of target 200 using microwaves of sufficient wavelength to penetrate target 200 as previously described. The irradiating microwaves may be generated with varying pulse widths. Sensing device 100 may record data about target 200 between successive emissions of pulsed microwaves. Image processing device 700, using the temperature response to the irradiating microwaves over time, determines the heat capacity and/or thermal diffusivity of the target 200 and characterize the material makeup of the target 200 and/or objects within target 200. In some embodiments, sensing device 100 makes these determinations. Thus, thermal sensing device 150 may detect explosives hidden within a body cavity of target 200. The temperature response over time for the explosives may be different from that of the body cavity. Image processing device 700 may use the measured heat capacity and/or thermal diffusivity of the object and compare it to known heat capacities and/or diffusivities of various materials. If the measured value matches the recorded value of a material, in this example explosives of a particular type, image processing device 700 alerts the operator that a threat object has been detected. In some embodiments, image processing device 700 alerts the operator using display 705 and/or user interface 707 (e.g., with sounds, images, vibrations, etc.).

In some embodiments, image processing device 700 characterizes an object and/or target 200 or infers its material makeup using image recognition techniques. Image processing device 700 may identify a detected object as a particular object or type of object. For example, image processing device 700 may compare an image of an object detected on or within target 200 to a database of images of known objects. This comparison may be made using an algorithm. If the object imaged by the sensing device 100 and/or image processing device 700 matches, within a tolerance, an image in the database, the object may be classified (e.g., the detected object is identified as a particular object or type of object). For example, an object which has the geometry of a handgun is imaged by the image sensing device 100 and image processing device 700. If the geometry of the image closely matches the geometry of a stored image of a handgun, the object may be classified or characterized as a handgun by image processing device 700. An alert may be generated as a result.

Figure 6:
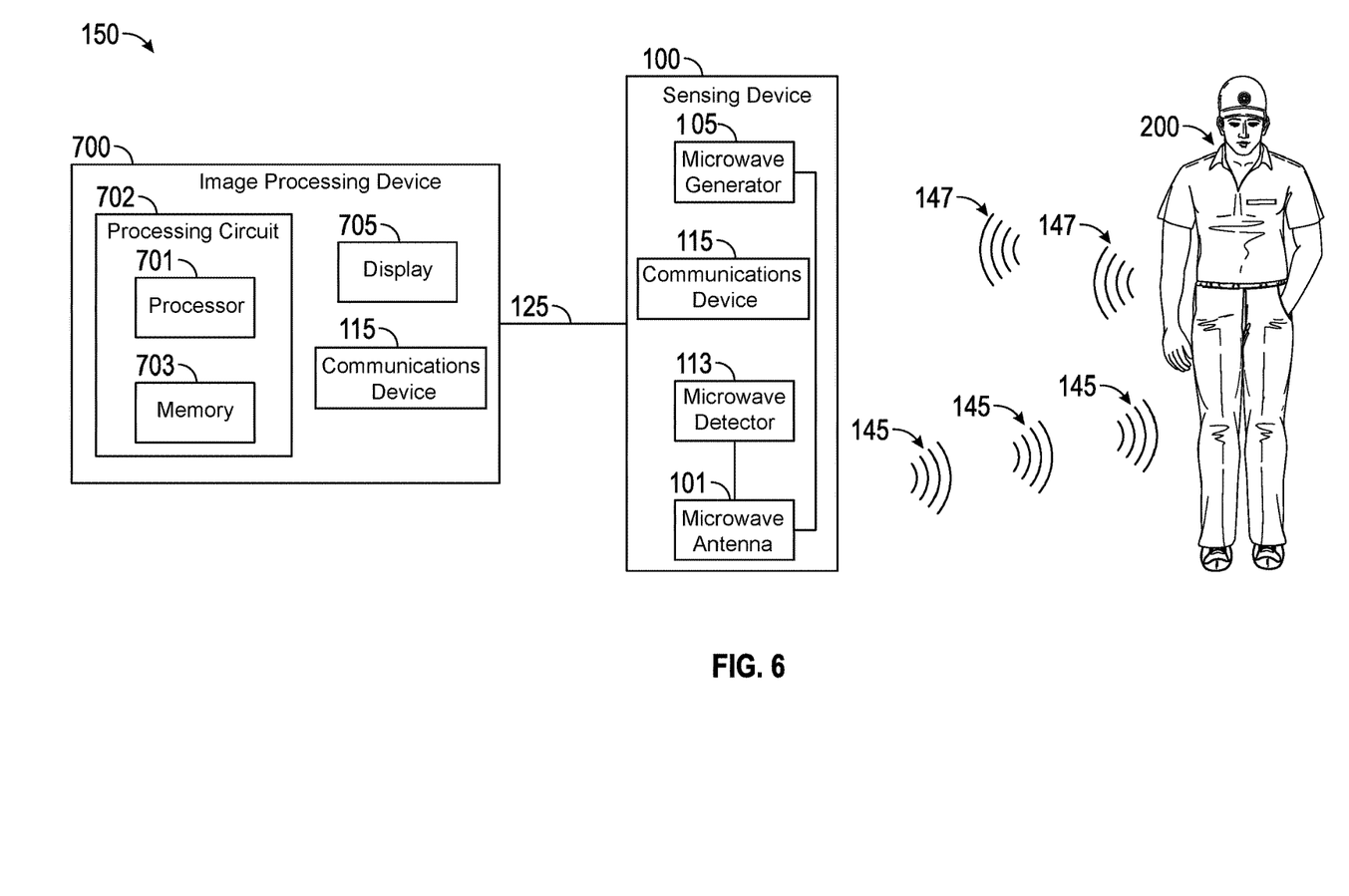
FIG. 6 is a schematic view of one embodiment of an imaging device which uses microwave radiation for both irradiation and imaging.

Referring now to FIG. 6, a schematic illustration shows another embodiment of the imaging device. This embodiment utilizes microwave radiation for both irradiating target 200 and for imaging target 200 by sensing microwave radiation from target 200. FIG. 6 further illustrates the components related to imaging with microwave radiation. This embodiment illustrates thermal sensing device 150 which images target 200 (e.g., a person) using microwaves 145 and 147. In some embodiments, sensing device 100 uses only microwave radiation. In the illustrated embodiment, a single microwave antenna 101 both emits and receives microwave radiation; in other embodiments, separate antennas may be used. The embodiment includes a sensing device 100. Sensing device 100 includes communication device 115. Communication device 115 transfers data gathered by microwave detector 113 to image processing device 700. Communications device 115 may provide data transfer to and from image processing device 700 (e.g., transmit gathered data and/or receive command signals). Communications device 115 provides this data transfer through communications connection 125. Communications connection 125 may be a wire or wireless connection between communication device 115 and another source or receiver of data. For example, communications connection 125 may be a connection over a wireless network (e.g., WiFi, Zigbee, Bluetooth, etc.), a wired interface (e.g., Ethernet, USB, Firewire, etc.), or other communications connection (e.g., infrared, optical, ultrasound, etc.). Communications device 115 may be a wireless networking device or wired networking device which establishes communication connection 125 and transmits and/or receives data through communications connection 125.

In the illustrated embodiment, sensing device 100 includes microwave generator 105. As previously discussed with reference to FIG. 2, microwave generator 105 produces electromagnetic radiation in the microwave spectrum. Microwave generator 105 (e.g., a magnetron) is configured to selectably produce microwaves at varying pulse widths, frequencies, wavelengths, etc. The microwaves produced by microwave generator 105 are transferred to microwave antenna 101 using waveguide 111. Waveguide 111 may be any waveguide suitable for transmitting/transferring microwaves. For example, waveguide 111 may be a dielectric waveguide, rectangular waveguide, hollow metallic waveguide, flexible waveguide, etc. Microwave antenna 101 emits microwaves from microwave generator 105. Microwave antenna 101 is any single antenna 101 suitable for emission of and reception of microwaves. For example, microwave antenna may be an electronically scanned antenna array. The same single array may be used for both transmission of irradiating microwaves focused at target 200 or a portion thereof and for reception of microwaves from target 200 or a portion thereof. Microwave antenna 101 focuses on a particular portion of target 200. Emitted microwaves 145 irradiate the particular portion of target 200 on which they are focused by microwave antenna 101. The irradiated portion of target 200 emits microwave radiation of a different frequency due to the irradiation. These response microwaves 147 are sensed by microwave antenna 101. The sensed response microwaves are then measured by microwave detector 113. As discussed with reference to FIG. 2, microwave detector 113 may be configured to measure of a variety of parameters. For example, microwave detector 113 is a radiometer configured to measure the brightness of response microwaves 147 in the illustrated embodiment. After a portion of target 200 has been irradiated and the response microwaves 147 are measured by microwave detector 113, the process may be repeated for additional portions of target 200.

As each portion of target 200 is irradiated and measured, the modes of operation discussed in FIGS. 2-4 may be used to collect additional data. By irradiating a portion of target 200, waiting, and measuring the response microwaves 147, a single microwave antenna 101 may be used to actively image target 200. This is the principle of operation discussed with reference to FIG. 3. As sensing device 100 is imaging a particular portion of target 200, additional modes of operation may also be used to gather additional data. The mode of operation of irradiating and then measuring may be repeated several times for a single portion of target 200. During successive iterations of this mode of operation, the characteristics of emitted microwaves 145 may be varied by microwave generator 105 and/or microwave antenna 101. By varying the wavelength of the emitted microwaves 145 and measuring the response microwaves, data may be gathered regarding a portion of target 200 at varying depths relative to the surface of target 200. This process is described in greater detail with reference to FIG. 4. The data collected by this process may be used to construct a three dimensional image of the target. Also, while irradiating the same portion of target 200, the pulse width of emitted microwaves 145 may be varied. This allows for the response microwaves 147 resulting from different heating patterns to be measured. This data (the temperature time response of the portion of target 200) may be used to calculate the heat capacity and/or diffusivity of the portion of the target being measured. This process is described in greater detail with reference to FIG. 5A and FIG. 5B. One or more, or all of these techniques may be applied to a single portion of target 200. This includes a single portion of target 200 at a specific depth. For example, emitted microwaves at a specific wavelength may irradiate a portion of target 200 at a specific depth. The temperature may then be measured via the response microwaves 147. Using the same wavelength of emitted microwaves 145, the pulse width may be varied and the time-dependent temperature response of the portion of target 200 at the same depth may be measured as well.

The embodiment of thermal sensing device 150 illustrated in FIG. 6 also includes image processing device 700. Image processing device 700 includes communications device 115 to receive data from sensing device 100 and to send control signals to sensing device 100. Image processing device 700 also includes display 705, on which is displayed an image of the target and other relevant information (e.g., if any threat objects are detected, the mode of operation, etc.). To perform the necessary calculations and display the results, image processing device 700 includes processor 701 and memory 703.

As previously discussed, sensing device 100 may selectively irradiate and then measure one portion of target 200 at a time. In some embodiments, this is done using an active phase array microwave antenna 101 which is electronically scanned from one portion of target 200 to another. This may allow sensing device 100 to irradiate a portion of target 200, measure the microwaves emitted by that portion of target 200, and then move on to another portion. This process may be repeated until data is gathered for all or a desired part of target 200. A plurality of portions of target 200 may be scanned using a scanning grid which defines each portion. The grid may be three dimensional where cells of various depths are scanned by altering the wavelength of the irradiating microwave radiation as described herein. To irradiate and measure microwaves corresponding to each cell of the image grid, microwave antenna 101 may be electronically scanned from one cell to another. For example, microwave antenna 101 may be a phase array antenna. Microwave antenna 101 may irradiate and sense microwaves corresponding to each cell using techniques such as beamforming, beam steering, beam tilt, and/or other techniques which vary the focus and/or spatial sensitivity of microwave antenna 101. Image processing device 700 may then use this information gathered with respect to particular portions of target 200 to generate an image of the entirety of target 200. In some embodiments, sensing device 100 uses the information to generate an image of target 200. The data collected for each portion of target 200 may be constructed into an image of the entire target 200 using data processing/image processing algorithms. The resulting image may be two dimensional or three dimensional. In some embodiments, sensing device 100 uses microwaves of a wavelength suitable for imaging surface 201 of the target 200 (e.g., a body surface covered by clothing). This may allow image processing device 700 to construct a two dimensional image of the surface of target 200 by combining data gathered by sensing device 100 for each individual portion of target 200. In some embodiments, sensing device 100 uses microwaves of a wavelength suitable for penetrating target 200. This may allow image processing device 700 to construct a three dimensional image of target 200 by combining data gathered by sensing device 100 for an individual portion of target 200. In this case, the individual portion of target 200 may be a particular location relative to the surface of the target and at a particular depth relative to the surface of the target.

Figure 7:
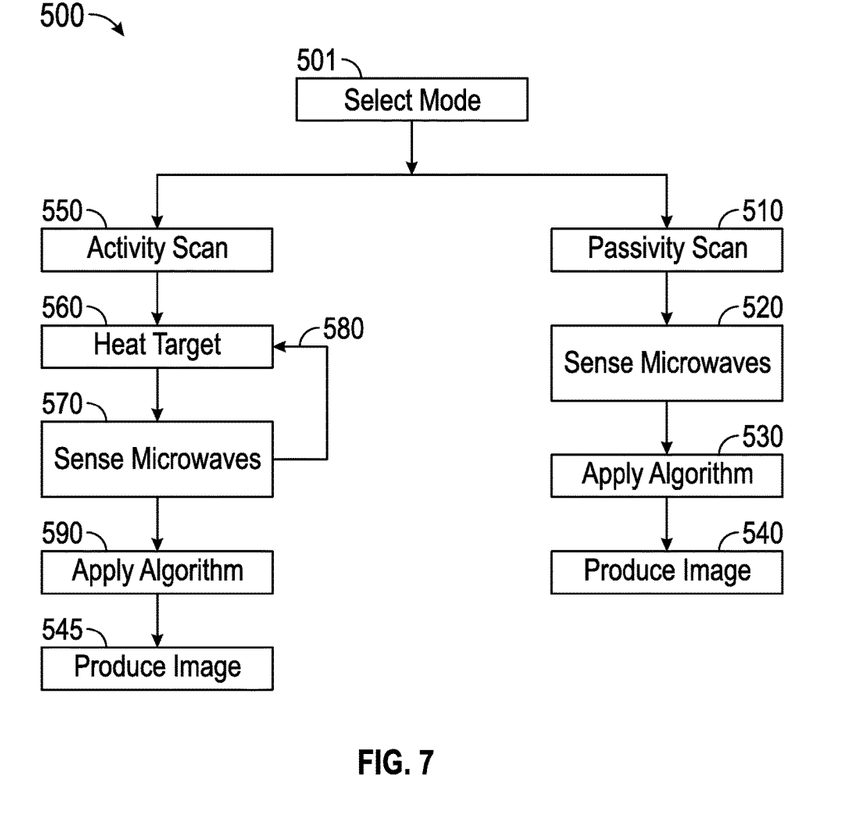
FIG. 7 is a block diagram of a method of imaging using a microwave imaging device according to one embodiment.

FIG. 7 illustrates method 500 for imaging a target (e.g., using thermal sensing device 150 discussed above). A mode is selected (501). A mode command may be acquired by the image processing device from a user input, sensing device 100, internal programming, an additional computer, etc. In some embodiments, the mode is preset for the particular application of the imaging device. In some embodiments, the mode may be selected by the operator of thermal sensing device 150 using image processing device 700. Specifically, the operator may select the mode using display 705 and/or user interface 707. The selection may be made by the operator following a prompt by image processing device 700. This prompt may be made following the detection of a target in the area in which sensing device 100 is set to operate. The prompt may also be made in response to a particular parameter measured by sensing device 100. For example, sensing device 100 may operate in passive mode (passively imaging). If sensing device 100, alone or in conjunction with image processing device 700, detects, using passive imaging, an object entering the area in which sensing device 100 operates, a prompt to select the mode may be made. The operator may elect to continue imaging in passive mode or to image in active mode (active imaging). In some embodiments, image sensing device 100, alone or in conjunction with image processing device 700, may detect a threat object in passive mode or an object that is characterized as likely a threat object. In that case, image processing device 700 prompts the operator to switch to active scanning mode for additional imaging. In some embodiments the image sensing device 100, alone or in conjunction with image processing device 700, detects an object but will be unable to classify or characterize it without additional information. In that case, image processing device 700 prompts the operator to switch to active scanning mode to generate additional information. In some embodiments, the mode is selected automatically by image sensing device 100 and/or image processing device 700 based on one or more of the above discussed scenarios. In some embodiments, sensing device 100 may include one or more of user interface 707, display 705, processor 701, and memory 703. Sensing device 100 may perform the functions of image processing device 700 described herein in some embodiments.

If the active scanning mode is selected, then the target is actively scanned (550). In some embodiments, sensing device 100 actively scans the target 200. To actively scan the target 200, the target is heated (560). In some embodiments, sensing device 100 heats the target 200. To heat the target, sensing device 100 may use any of the components and techniques described herein. For example, sensing device 100 may heat target 200 by irradiating it with microwaves, infrared radiation, and/or electromagnetic radiation delivered by laser beam. After heating the target, microwaves are sensed (570). In some embodiments, sensing device 100 senses microwaves emitted by target 200 in response to being irradiated. Sensing device 100 may sense microwaves using any of the techniques described herein. For example, sensing device 100 may sense microwaves using microwave antenna 101 and microwave detector 113.

After sensing microwaves, the sensing device may repeat heating the target and sensing microwaves (580). Sensing device 100 may repeat these steps to perform a variety of imaging functions. In some embodiments, image sensing device 100 repeats the steps in order to image all of target 200 one portion at a time. In this case, sensing device 100 heats a portion of the target at a particular location. For example, this may be done using an electronically scanned, active phase array microwave antenna 101 emitting microwaves produced by microwave generator 105. The sensing device then measures the electromagnetic radiation emitted by the portion of the target in response to being heated. This is accomplished by sensing microwaves emitted by the portion of the target. The process is then repeated until the entire target 200 or a desired portion thereof is irradiated and measured. In some embodiments, image sensing device 100 repeats in order to generate time-dependent temperature responses for a portion or portions of the target 200. This may be done by irradiating a particular portion of the target with electromagnetic radiation with a first pulse width, measuring the response, and then repeating the process, with respect to the same portion of the target, using a different pulse width. In some embodiments, image sensing device 100 repeats the steps in order to generate data at various depths of target 200. For example, image sensing device may irradiate target 200 with microwaves of a first wavelength, measure the microwaves emitted by that portion of the target, and then repeat for the same portion of target 200 using microwaves of a second wavelength. This may be further repeated to measure data at a plurality of depths. The process can also be repeated at various points of target 200 to create a three dimensional image of target 200 or a portion thereof. In some embodiments, image sensing device 100 repeats in order to generate various types of data (e.g., frequency of response, power, intensity, etc.).

In some embodiments, repetition of heating the target and sensing microwaves may be used to accomplish a combination of some or all of the processes described above. Multiple processes (e.g., varying the pulse width and varying the wavelength) and measuring the resulting microwaves response may be completed with respect to a particular point of target 200 before moving on to the next point. In some embodiments, a particular process may be completed for a multitude of points of target 200 before another process is used to collect data regarding the same points of target 200.

After sensing the microwaves from the target 200 and/or the completion of repetition, an algorithm is applied to the data (590). In some embodiments, image processing device 700 applies an algorithm to the data. Sensing device 100 may send gathered data image processing device 700 using communications device 115 and communications connection 125. Image processing device 700 may use the data and algorithms to generate an image of the target and perform other related tasks. In some embodiments, image processing device 700 uses algorithms to perform digital signal processing. Once the data is converted to digital form, (in some embodiments by the image processing device 700, in other embodiments by the sensing device 100) digital signal processing algorithms may be applied to the signals from the sensing device 100. This may include signal sampling, eliminating or reducing signal noise, analyzing data in multiple domains, etc. Algorithms may also be used by image processing device 700 to conduct digital imaging processing. This may include classification, feature extraction, pattern recognition, multi-scale signal analysis, etc. For example, algorithms performing digital signal analysis may be used by image processing device 700 to characterize an object as a threat object. The image processing device may use algorithms to generate an image of the target. In some embodiments, the image is two dimensional (e.g., the surface of the target such as a person's skin, objects thereon, a person's clothing, objects covered by clothing, objects in a person's pockets, etc.). In some embodiments, the image is three dimensional (e.g., includes the above and body cavities, objects in body cavities, etc.). In other embodiments, sensing device 100 applies algorithms to the data. After the image processing device has applied algorithms, the image processing device produces the image (545). Producing the image may include displaying the image on display 705, applying color rendering methods to generate a false color image of the object, using algorithms to assemble image data corresponding to imaged cells of target 200, etc.

If the passive mode is selected, then the target is passively scanned (510). In some embodiments, sensing device 100 passively scans target 200. To passively scan target 200, the sensing device 100 may measure the electromagnetic radiation emitted by target 200. In some embodiments, sensing device 100 senses microwaves emitted by target 200. Sensing device 100 may sense microwaves using one or more of the techniques previously described. For example, sensing device 100 may sense microwaves from the target using microwaves antenna 101 and microwave detector 113. In some embodiments, sensing device 100 senses electromagnetic radiation one portion of target 200 at a time. For example, a microwave antenna 101 (e.g., electronically scanned antenna) may be focused on a portion of target 200 to be imaged. The microwave radiation is measured, and then the sensing device 100 may repeat the process for the remaining portions of target 200 to be imaged. In other embodiments, sensing device 100 passively senses microwaves emitted by the target 200 for the entire target at one time.

After sensing the microwaves emitted by target 200, an algorithm is applied to the data (530). In some embodiments, image processing device 700 applies an algorithm to the data gathered by measuring the microwaves. In some embodiments, sensing device 100 may apply the algorithm (e.g., microwave detector 113 may include data processing components). Image processing device 700 uses the data and algorithms to generate an image of the target and perform other related tasks. Image processing device 700 may use algorithms to perform digital signal processing. Once the data is converted to digital form, (in some embodiments by image processing device 700, in other embodiments by sensing device 100) digital signal processing algorithms may be applied to the signals from sensing device 100. This may include signal sampling, eliminating or reducing signal noise, analyzing data in multiple domains, etc. Algorithms may also be used by image processing device 700 to conduct digital imaging processing. This may include classification, feature extraction, pattern recognition, multi-scale signal analysis, etc. For example, algorithms performing digital signal analysis may be used by image processing device 700 to characterize an object as a threat object. The image processing device may use algorithms to generate an image of the target. In some embodiments, the image is two dimensional (e.g., the surface of the target such as a person's skin, objects thereon, a person's clothing, objects covered by clothing, objects in a person's pockets, etc.). In some embodiments, the image is three dimensional (e.g., includes the above and body cavities, objects in body cavities, etc.).

Other algorithms, microwave thermometry techniques, radiometry techniques, data analysis techniques, and or other processing can be used to perform the functions described herein. For example, microwave radiometry techniques which may include thermal modelling can be applied using the systems and methods described herein in order to produce and/or analyze data (e.g., thermal data) corresponding to one or more portions of target 200. Examples of these techniques are presented "Monitoring of deep brain temperature in infants using multi-frequency microwave radiometry and thermal modelling", J. W. Hand, G. M. J. Van Leeuwen, S. Mizushina, J. B. Van de Kamer, M. Maruyama, T. Sugiura, D. V. Azzopardi, and A. D. Edwards, Physics in Medicine and Biology, Vol. 46, p 1885, 2001. Further examples of techniques which may be used in processing temperature data (e.g., thermal data) sensed using the systems and methods described herein are presented in "Retrieval of Temperature-Depth Profiles in Biological Objects from Multi-Frequency Microwave Radiometric Data", S. Mizushina, T. Shimizu, K. Suzuki, M. Kinomura, H. Ohba, and T. Sugiura, Journal of Electromagnetic Waves and Applications, Vol. 7, No 11, 1993.

After the image processing device has applied algorithms, an image is produced (540). In some embodiments, image processing device 700 produces the image. Producing the image may include displaying the image on display 705, applying color rendering methods to generate a false color image of the object, generating an image from data corresponding to imaged cells of target 200, etc. In other embodiments, the image may be produced by sensing device 100.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A microwave thermal sensing device, comprising:
a magnetron configured to generate microwave radiation and direct the microwave radiation toward a target, the microwave radiation having a first wavelength at a first time and a second wavelength at a second time;
a microwave sensor coupled to the magnetron and configured to acquire sensor data based on detecting and measuring microwave radiation emitted from the target; and
a processing device for utilizing an algorithm to produce thermal data based on the sensor data;
wherein the second wavelength is longer than the first wavelength, the second wavelength causing the microwave radiation generated by the magnetron and having the second wavelength to penetrate to a greater depth of an internal portion of the target than the microwave radiation generated by the magnetron and having the first wavelength.

2. The device of claim 1, wherein the microwave sensor is configured to acquire sensor data corresponding to a plurality of depths of the internal portion of the target based on detecting and measuring microwave radiation emitted from the plurality of depths of the internal portion of the target.

3. The device of claim 2, wherein the processing device is for utilizing an algorithm to produce thermal data corresponding to the plurality of depths of the internal portion of the target.

4. The device of claim 1, wherein the magnetron is configured to produce microwave radiation pulses having a first pulse width at a first time and a second pulse width at a second time.

5. The device of claim 1, wherein the microwave antenna is configured to be physically scanned such that the microwave radiation directed from the microwave antenna is steered in different directions by physically moving the microwave antenna.

6. The device of claim 1, wherein the microwave antenna is configured to be electronically scanned such that the microwave radiation directed from the microwave antenna is electronically steered in different directions without physically moving the microwave antenna.

7. The device of claim 1, wherein the microwave antenna is configured to receive microwave radiation from a specified internal target location.

8. The device of claim 1, wherein the processing device is for utilizing a compressive imaging algorithm to image the target.

9. The device of claim 1, wherein the magnetron is configured to emit microwave radiation at a first set of time values and the microwave sensor is configured to sense microwave radiation at a second set of time values.

10. The device of claim 9, wherein the first set of time values and the second set of time values define mutually exclusive and alternating time periods.

11. The device of claim 1, wherein the magnetron is configured to emit microwave radiation at a first set of frequency values and the microwave sensor is configured to sense microwave radiation at a second set of frequency values.

12. The device of claim 1, wherein the microwave sensor is configured to measure a time-dependent thermal response of the target using microwave thermometry.

13. The device of claim 1, wherein the internal portion of the target comprises an object in a body cavity.

14. The device of claim 13, wherein the processing device is for characterizing the object as a threat object.

15. The device of claim 1, wherein the processing device is for determining a heat capacity of at least a portion of the target.

16. The device of claim 1, wherein the processing device is for determining a thermal diffusivity of at least a portion of the target.

17. The device of claim 1, wherein the processing device is for determining a material of at least a portion of the target.

18. The device of claim 1, wherein the processing device is for categorizing an object detected inside a body cavity.

* * * * *